United States Patent [19]

Höfling et al.

[11] Patent Number: 4,703,187

[45] Date of Patent: Oct. 27, 1987

[54] METHOD AND APPARATUS FOR THE DETERMINATION OF THE THICKNESS OF TRANSPARENT LAYERS OF LACQUER

[75] Inventors: Erich Höfling; Zdenek Maly, both of Kreuzlingen, Switzerland

[73] Assignee: Swiss Aluminium Ltd., Chippis, Switzerland

[21] Appl. No.: 836,763

[22] Filed: Mar. 6, 1986

[30] Foreign Application Priority Data

Mar. 15, 1985 [CH] Switzerland .................. 1171/85

[51] Int. Cl.⁴ .................................................. G01J 1/00
[52] U.S. Cl. ...................................... 250/571; 250/228
[58] Field of Search ..................... 250/228, 571, 572; 356/236, 446

[56] References Cited

U.S. PATENT DOCUMENTS

| 2,821,103 | 1/1958 | Blet | 356/236 |
| 3,589,817 | 6/1971 | Sugaya | 250/572 |
| 4,150,898 | 4/1979 | Suga | 250/228 |
| 4,473,848 | 9/1984 | Juergensen | 250/228 |

FOREIGN PATENT DOCUMENTS 0008884 1/1977 Japan .................. 356/446

Primary Examiner—David C. Nelms
Assistant Examiner—S. Allen
Attorney, Agent, or Firm—Bachman & LaPointe

[57] ABSTRACT

The invention relates to a method and apparatus for the determination of the thickness of transparent, clear or colored, layers of lacquer on bright rolled, metallic foil or thin strip, in particular of aluminium or aluminium alloys, wherein the optical transmission factor (D) of the layer is determined. The attenuation of irradiated light reflected from the metallic surface disposed in an arched configuration is measured in the infrared to visible range after transmission through the layers of lacquer.

10 Claims, 2 Drawing Figures

METHOD AND APPARATUS FOR THE DETERMINATION OF THE THICKNESS OF TRANSPARENT LAYERS OF LACQUER

BACKGROUND OF THE INVENTION

The invention relates to a method for the determination of the thickness of transparent, clear or colored, layers of lacquer on bright rolled, metallic foils or thin strips, in particular of aluminum or aluminum alloys, wherein the optical transmission factor of the layer is determined. The invention further relates to apparatus for carrying our the method.

The industrial manufacturers of foils or thin strips rely on the fact that the lacquer invariably needs to be applied in a certain thickness. An objective color comparison is necessary, in particular in the case of the application of transparent coloured lacquers. By means of so-called colorimetrics, the colors are expressed in numerical terms.

It is known that the thickness of transparent layers can be measured in that the absorption of infrared or visible light is measured in a narrow spectral range. For this purpose the Lambert-Beer law known from classical physics is applied:

$$I_D = I_o \cdot e^{-k.c.s}$$

In this expression, $I_D$ represents the luminous energy emerging from the transparent layer, $I_o$ represents the luminous energy irradiated, k represents the molar extinction coefficient, c represents the concentration of the transparent dye and s represents the thickness of the layer of the transparent homogeneous medium.

The natural logarithm of the proportion $I_D/I_o$ of the luminous energy which is transmitted by the transparent layer, i.e. of the transmission factor D, thus amounts to $-k.c.s$.

In the case of the application of a homogeneous transparent layer, a change in the transmission factor permits a direct conclusion to be drawn regarding a change in the layer thickness, because not only the extinction coefficient k but also the concentration c remains constant.

In the existing practice of the coating of foils or thin strips, either the application of lacquer is monitored gravimetrically (in the case of clear lacquers) or the tone of the hue is monitored visually or by means of a colorimeter (in the case of transparent colored lacquers) using samples from the beginning and end of a roll. Any possible changes in the application of the lacquer, and thus possibly in the tone of the hue, which occur during the coating of a roll of foil, which has a running length of some thousands of meters, can thus only be detected at the end. This leads potentially to considerable losses of material and labour.

The inventors set themselves the object of providing a method and apparatus by which, in the case of moving foils or thin strips, in particular of aluminum or aluminum alloys, the thickness or the tone of the hue of the applied transparent, clear or colored, layers of lacquer can be measured continuously, on a non-contact basis and with great accuracy, it being possible for any changes to be indicated or automatically corrected directly after occurrence thereof.

SUMMARY OF THE INVENTION

In relation to the method the object is achieved according to the invention in that the attenuation of irradiated light reflected from the metallic surface disposed in an arched configuration is measured in the infrared to visible range after transmission through the layers of lacquer.

The measurements are preferably carried out on the moving foil or on the moving thin strip.

Preferably, the measurement values which are determined are compared with those of a calibration curve or with a theoretical value. Deviations are corrected manually or entirely automatically by increasing or reducing the application of lacquer.

For industrial practice, the following performance of the method according to the invention is proposed.

Rays of light which have been conducted through an aperture stop and focused and which are derived from a light source, which is stabilized in relation to intensity, are passed through an Ulbricht sphere to an exit aperture in the surface of the sphere. An image, serving as a measurement spot, of the aperture of the aperture stop, is formed on the surface of the foil or thin strip disposed in a cylindrically arched configuration in the region of this exit aperture. In the first instance, the focused rays of light forming the measurement spot are reflected after partial absorption in the transparent layer in a, to a greater or lesser extent, focused condition, in the Ulbricht sphere, and there undergo multiple further reflection. As a result of this, the Ulbricht sphere is uniformly illuminated, whereby the desired integration effect is achieved. Outside the range of action of the rays directly reflected by the foil or the thin strip, narrow band filters of conventional construction are fitted, which, in order to increase the sensitivity, transmit a narrow spectral range, suitable for the respective case, of the diffuse light incident thereon. An evaluating device with one or more phtodiodes and amplifier(s) conducts the signals to a computer. The latter compares the signals with a predetermined standard value, computes deviations and displays the latter on a screen and possibly records them in a mass storage device. The evaluated signals can be employed for automatic process control, i.e. for the regulation of the application of lacquer.

The focused rays are preferably conducted through the region of the center of the Ulbricht sphere.

The invention also includes apparatus for carrying out the method according to the invention, the apparatus comprising a radiation source, which is stabilized in relation to intensity, for the at least partially directed emission of light in the infrared or visible range; an optical arrangement, including a condenser, an aperture stop and an objective for the formation of focused rays; an Ulbricht sphere provided with entrance and exit apertures for the focused rays; a guide roller, which is disposed with its envelope surface tangential, or very slightly outside a plane tangential, to the Ulbricht sphere, in the region of the exit aperture, over which, in use, the foil or the thin strip passes with the layer to be measured facing the Ulbricht sphere and thus adopts a reproducible position suitable for the measurement; a light trap, which screens the exit aperture in the ulbricht sphere from extraneous light incident from outside and which is disposed at a small spacing from the guide roller; at least one narrow band filter on the internal surface of the sphere, outside the range of the direct reflection of rays from the foil or the thin strip; and a detector, disposed behind the narrow band filter, with an amplifier.

In order to measure the thickness of colorless layers of lacquer, infrared radiation is employed, which is preferably generated by a Nernst needle. The radiation-reflecting internal coating of the Ulbricht sphere is expediently provided with a matt gold plating or provided with another coating which is diffusely reflecting in the wavelength range between 3 and 4 μm. The narrow band filter is expediently an interference filter having a spectral range around approximately 3.3 μm.

The visible light for the measurement of colored lacquers is, on the other hand, expediently generated by a quartz-iodine lamp, and the focused rays are conducted through an Ulbricht sphere which exhibits an internal white coating, for example of barium sulphate or magnesium oxide. In the case of visible light, the narrow band filter is preferably an interference filter, the transmission range of which is selected in each instance in accordance with the spectral properties of the tone of the hue.

The narrow band filter of the device according to the invention must never collect rays directly reflected by the foil or the thin band, but in all cases only the integrated radiation reflected by the coated internal surface of the Ulbricht sphere. The narrow band filter(s) is/are preferably disposed on the circle of intersection which is generated at the surface of the Ulbricht sphere by a plane which is determined by the axis of the guide roller and the radiation source. Since the axis of the guide roller and the focusing rays conducted through the Ulbricht sphere form a right-angle, no reflected rays impinge on the circle of intersection. The filters are preferably disposed at an angle of 90° to the optical axis of the Ulbricht sphere.

In particular in the event of the application of a single narrow band filter, the preferred location thereof is the point of intersection of the abovementioned circle of intersection with the median perpendicular plane of the focusing rays conducted through the Ulbricht sphere.

BRIEF DESCRIPTION OF THE DRAWINGS

Apparatus constructed in accordance with the invention for the determination of the thickness of transparent clear or colored, layers of lacquer is illustrated by way of example in the accompanying drawings, in which.

DETAILED DESCRIPTION

Figure 1:
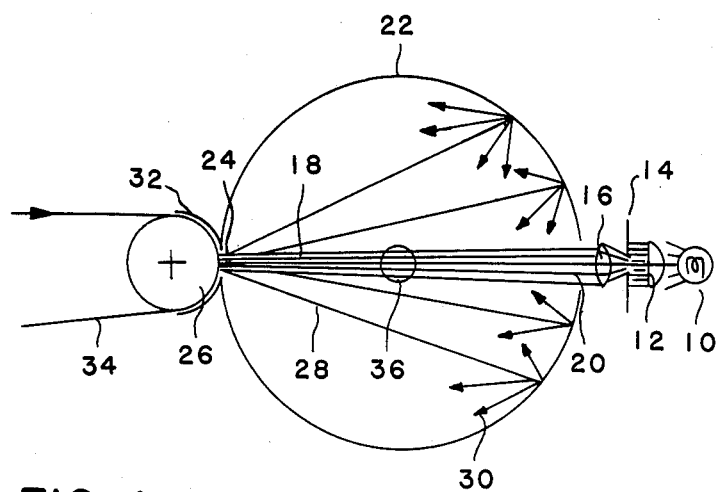
FIG. 1 is a schematic side elevation, partly cut away.

A radiation source 10 consists of a quartz-iodine lamp, and thus emits visible light, which is directed parallel by a condenser 12. The light, which is now directed parallel, impinges on an aperture stop 14. An objective 16 generates focused rays 18, which pass through an entrance aperture 20 into an Ulbricht sphere 22. The latter has, for example, a diameter of 10–20 cm and a coated internal surface appropriate for the type of radiation. The focused rays 18 penetrate the Ulbricht sphere 22 via the center of the sphere and finally leave it through the exit aperture 24. The condenser 12 and the obective 16, both of which are optical lenses, consist of optical glass for visible light, and for example of common salt or geranium for infrared radiation.

In the region of the exit aperture 24, a guide roller 26 is disposed tangentially in relation to the Ulbricht sphere 22. Foil or thin strip 34 with the transparent layer of lacquer to be measured is conducted over this guide roller 26, which has a diameter of 50–150 mm, which is customary in the processing of foils.

The object 16 is designed and disposed in which a manner that the aperture of the aperture stop 14 is imaged on the moving foil/thin band 34 and forms a measurement spot having a diameter of 1–2 cm. The exit aperture 24 is somewhat larger than the measurement spot.

The focused rays 18 are transmitted by the transparent lacquer with slight attenuation of the light, reflected virtually completely on the bright metal surface and again transmitted by the transparent lacquer with loss. The cylindrically curved surface of the guide roller 26 and thus of the foil or of the thin strip 34 brings about a situation in which the reflection of the focused light rays 18 are substantially perpendicular to the axis of the guide roller 26, but are reflected so as to fan out over a large angular range. The direct reflection 28 passes in part back to the light source, but for the most part impinges on the internal surface, which is reflecting, of the Ulbricht sphere 22. Indirect reflection 30 is generated there, which forms the diffuse light in the sphere and illuminates the latter.

The limitation of the direct reflection 28 is essentially dependent upon the diameter of the guide roller 26 and upon the size of the measurement spot.

The illumination of the Ulbricht sphere 22 by diffuse light is the greater, the smaller is the diameter of the guide roller 26, the larger the measurement spot and the stronger the light source 10.

In the region of the exit aperture 24 there is disposed a light trap 32, which is disposed concentrically in relation to the guide roller 26 and which is blackened on the side facing the foil/thin strip 34. The spacing between the light trap 32 and the foil/thin strip 34 moving on the guide roller 26 is as small as possible, but free from contact.

Figure 2:
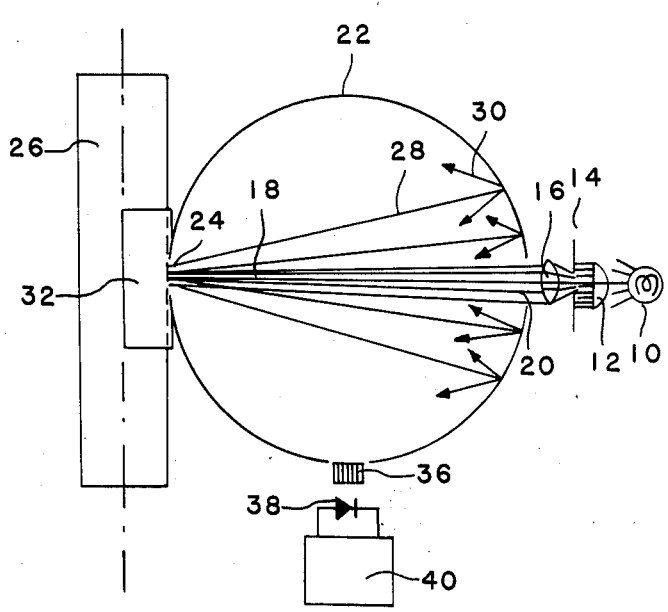
FIG. 2 is a schematic plan view, partly cut away.

In particular, FIG. 2 shows clearly how a narrow band filter 36 is disposed outside the region of direct reflection 28. The narrower is the band of the spectral range of the filter, the greater is the sensitivity of the method of measurement. In practice, for example four narrow band filters 36 per sphere are disposed closely adjacent to one another, and these are expediently exchangeable. The four built-in narrow band filters together with associateed equipment are indeed all mounted; however, only the one with the range of action which is most favourable in the pertinent case is actuated in each instance.

A detector 38 is disposed directly behind the narrow band filter 36. For visible light, a silicon photodiode is usual, but phototransistors and photoresistors may also be used; for infrared light, detectors based on lead sulphide and lead selenide are preferred as detector 38.

The signals generated in the detector 38 are amplified in an amplifier 40 and further conducted from there to a computer. The results are evaluated with the application of the above explained Lambert-Beer law.

Although, in practice, measurement values are preferably compared with a standard value, i.e. are related to a standard, absolute measurements are also possible. For this purpose, it is however necessary for the absorption constant of the pertinent layer for the frequency of the narrow band filter to be empirically set in advance. A reflection known beforehand can then be associated with a specified formula.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. A method of determining the thickness of a transparent layer of lacquer on a surface of a metal, wherein the optical transmission factor of said layer is determined, the improvement comprising directing light toward the lacquered metal surface and measuring the attenuation of irradiated light reflected from said metallic surface, which is disposed in arched configuration, in the infrared to visible range after transmission through the layer of lacquer.

2. A method according to claim 1 including measuring while said metal is moving.

3. A method according to claim 1 including comparing said measured light with that of standard sample.

4. A method according to claim 1 including transmitting focused rays of said light from a light source, which is stabilized in relation to intensity, through an Ulbricht sphere to an exit aperture in the surface of said sphere, providing a light trap disposed concentrically relative to said metallic surface at a distance proximate to said metallic surface, generate on a substantially cylindrically curved region of said surface of said metal an image, serving as a measurement spot, of an aperture of an aperture stop, from said measurement spot impinge on the internal surface of said Ulbricht sphere by direct reflection and generate a diffuse light by further indirect reflections, wherein outside the range of action of said rays directly reflected by said metal at least one narrow band filter transmits a narrow spectral range of said reflections forming said diffuse light, and an evaluating device measures the intensity thereof for, display and comparison with a standard value.

5. A method according to claim 4 including transmitting said focused rays through a central region of said Ulbricht sphere.

6. An apparatus for determining the thickness of a layer of lacquer on the surface of a metal comprising a radiation source, which is stabilized in relation to intensity, for the at least partially directed emission of light in the infrared or visible range; and optical arrangement, including a condenser; an aperture stop and an objective for the formation of focused rays; an Ulbricht sphere provided with an internal surface and with entrance and exit apertures for said focused rays; a guide roller, which is disposed with its envelope surface substantially tangential to said Ulbricht sphere, in the region of said exit aperture, over which said metal passes with said layer to be measured facing said Ulbricht sphere and thus adopts a reproducible position suitable for said measurement; a light trap disposed concentrically with respect to said metallic surface and proximate thereto, which screens said exit aperture in said Ulbricht sphere from extraneous light incident from outside and which is disposed at a small spacing from said guide roller; at least one narrow band filter on said internal surface of said sphere, outside the range of direct reflection of rays from said metal; and a detector, disposed behind said narrow band filter, and associated with an amplifier.

7. An apparatus according to claim 6 wherein said radiation source is a Nernst needle for producing infrared light and said Ulbricht sphere is provided with a matt gold plating on said inner surface thereof.

8. An apparatus according to claim 6 wherein said radiation source is a quartz-iodine lamp for producing visible light and said Ulbricht sphere is provided on said inner surface thereof with a material selected from barium sulphate and magnesium oxide.

9. An apparatus according to claim 6 wherein said narrow band filter is disposed on the circle of intersection of the plane defined by the axis of said guide roller and said radiation source, and said inner surface of said Ulbricht sphere.

10. An apparatus according to claim 9 wherein a narrow band filter is disposed on a point of intersection of said circle of intersection with the median perpendicular plane of said focused rays transmitted through said Ulbricht sphere.

* * * * *